United States Patent [19]

Gray

[11] Patent Number: 5,020,870

[45] Date of Patent: Jun. 4, 1991

[54] BINOCULAR KALEIDOSCOPE

[76] Inventor: Steven J. Gray, 2970 Sourdough Rd., Bozeman, Mont. 59715

[21] Appl. No.: 254,163

[22] Filed: Oct. 6, 1988

[51] Int. Cl.⁵ ............................................. G02B 23/00
[52] U.S. Cl. .................................................... 350/4.1
[58] Field of Search ...................... 350/4.1, 4.2; 353/1, 353/2

[56] References Cited

U.S. PATENT DOCUMENTS

| | | | |
|---|---|---|---|
| 3,809,879 | 5/1974 | Gonzalez | 350/4.1 X |
| 4,815,801 | 3/1989 | Anderson | 350/4.1 |
| 4,820,004 | 4/1989 | Briskin | 350/4.1 |

Primary Examiner—Richard A. Wintercorn
Attorney, Agent, or Firm—William D. West

[57] ABSTRACT

A binocular kaleidoscope for producing multiple images is disclosed. The kaleidoscope provides a viewing channel having converging interior reflective surfaces with angled apertures converging toward the line of convergence of the reflective surfaces. Rotatable disks are mounted substantially normal to the angled apertures between the reflective surfaces and reflective sidewalls for completing the viewing channel. A housing and stand for the binocular kaleidoscope is disclosed as are methods for producing images by using the invention.

18 Claims, 4 Drawing Sheets

BINOCULAR KALEIDOSCOPE

BACKGROUND OF THE INVENTION

1. Field of the Invention

This invention relates to a binocular kaleidoscope and in particular to such a kaleidoscope for simultaneously viewing images produced by converging planar mirrors.

2. Discussion of the Technical Problems

Ever since the kaleidoscope was invented by Sir David Brewster in 1815, the instrument has been a source of beauty and amazement to millions of people throughout the world. Conventional kaleidoscopes are monocular in that one uses a single eye to view the image. Such kaleidoscopes provide substantially parallel mirrors placed within a tube, at one end of which is placed a rotatable cup having bits of colored glass. The reflection of the images between the parallel planar mirror surfaces generate a complex mirror field which is at once both beautiful and pleasant.

While conventional kaleidoscopes have been made of many designs and attempts have even been made to produce kaleidoscopes having separate images for each eye, no truly binocular kaleidoscopes in which the same image is viewed by both eyes has been produced. Separate images for each eye in double barrelled kaleidoscopes create confusion and are difficult to view. In order to view a single image with both eyes in a conventional kaleidoscope fashion a large tube could be used but, the image produced is confusing and does not allow for proper focusing of the viewer's eyes using normal binocular vision. Furthermore, as the viewing tube is enlarged, the intricate patterns are reduced as the planar surfaces are moved farther apart. The resulting image is not as pleasing as one produced with the smaller tube in the conventional monocular kaleidoscope.

The conventional monocular kaleidoscope produces its images by the interactive reflection between the mirrored surfaces within the kaleidoscope. Those mirrored surfaces are elongate rectangles arranged substantially parallel to one another along their longitudinal axis and yet they converge at their edges producing a longitudinal seam. The conventional monocular kaleidoscopes may use three, four, or more such longitudinally parallel mirrors. Besides not being able to use both eyes simultaneously in viewing the images in a conventional monocular kaleidoscope, it has been found that conventional monocular kaleidoscopes are limited in light gathering. The light source for illuminating the colored bits of glass within the rotating cup must be at or near the end of the kaleidoscope.

The ideal kaleidoscope would provide binocular viewing whereby a light source could be obtained from more than one angle and such a kaleidoscope would be mounted on a base at a comfortable viewing angle. Such a kaleidoscope would provide for simultaneous binocular viewing of the images produced and yet be capable of producing multiple images. Very few devices in the known art relate to kaleidoscopes which are capable of being viewed with both eyes simultaneously and none known are directed to providing a binocular kaleidoscope in which the images produced can be simultaneously viewed by both eyes. Accordingly, a need exists for a binocular kaleidoscope with a viewing system having interchangeable image producing color wheels. Such a kaleidoscope should be uncomplicated in design, mounted on a pedestal at a comfortable viewing angle, having selectively rotatable color wheels, and capable of admitting image producing light from multiple angles. A kaleidoscope of such a design should be not subject to damage by proper use and should be enclosed in a cabinet itself having a high level of aesthetic quality commensurable with the pleasing images produced within the kaleidoscope. The instant invention is directed to all these needs as well as to others as explained in the following summary.

SUMMARY OF THE INVENTION

It is a feature of the instant invention to provide a binocular kaleidoscope.

It is another feature of the instant invention to provide a binocular kaleidoscope having multiple image producing apertures.

It is another feature of the instant invention to provide a binocular kaleidoscope producing images to be viewed simultaneously by both of the viewer's eyes.

It is another feature of the instant invention to provide a binocular kaleidoscope having converging upper and lower planar mirror surfaces with side apertures having selectively rotatable color disks.

These and other features and objects are attained according to the instant invention by providing a binocular kaleidoscope housed in an artistic aesthetically pleasing wood cabinet maintaining a comfortable viewing angle of the kaleidoscope. The kaleidoscope provides a viewing channel having a clear glass covered viewing end and upper and lower reflecting planar mirror surfaces converging at an end opposite the viewing end. Substantially parallel side mirrors are provided between the upper and lower interior viewing surfaces and angled image producing apertures are provided at the sides between the line of convergence of the upper and lower image producing planar mirrors. Selectively rotatable light admitting colored wheels are provided adjacent and substantially normal to the viewing apertures for producing images of varied shapes when viewed through the viewing end.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
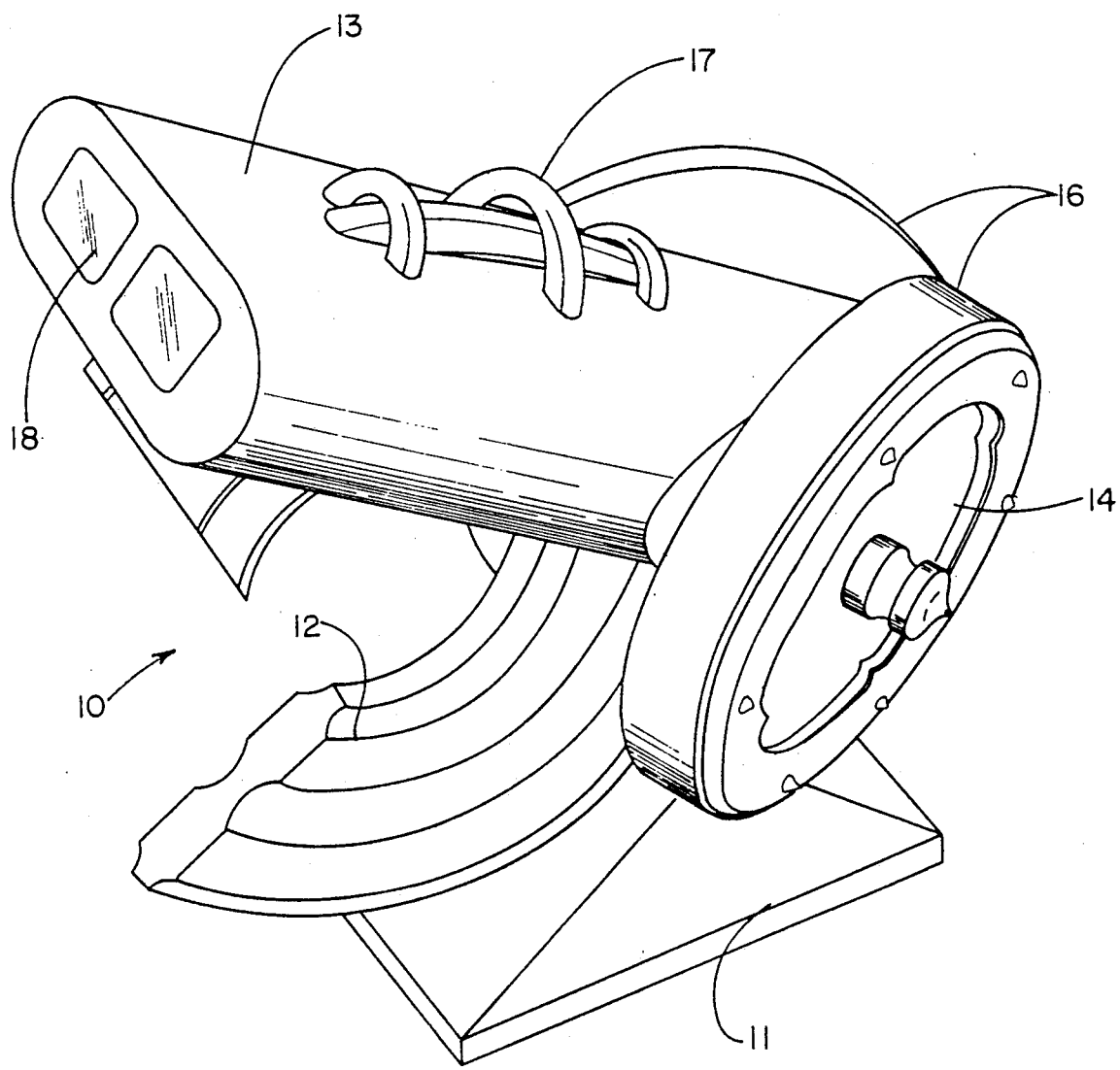
FIG. 1 is a perspective view of the binocular kaleidoscope according to the present invention in which the outer cabinet is depicted.

The outer appearance of the instant invention is depicted generally in FIG. 1. As can be seen by reference to FIG. 1, the invention 10 provides a stand base 11, an upright support 12 attached substantially normal to the stand base 11, a viewing channel 13 having viewing port 18 and a housing 16 covering the rotatable color wheels which are further covered with light defusing lense 14. Artistic enhancement and decoration 17 is further shown in FIG. 1. It should be noted that kaleidoscopes and the images produced are quite rightfully considered works of art so the outer appearance as depicted in FIG. 1 of the invention 10 should be compatible with the images produced by the kaleidoscope.

Figure 2:
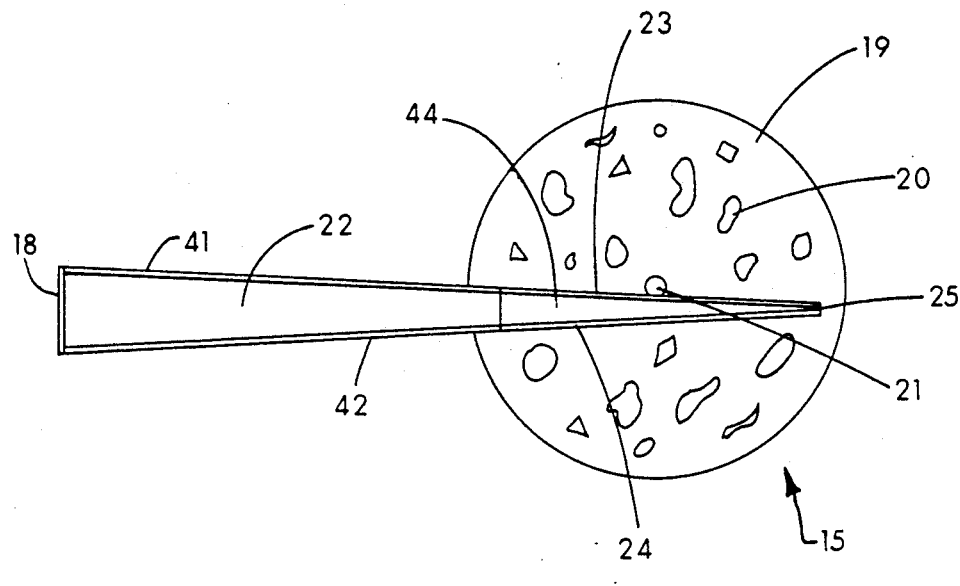
FIG. 2 is a side elevational view of the interior of the kaleidoscope dipicting the converging upper and lower reflective mirror surfaces and one of the rotatable side color wheels.

With reference to FIG. 2, it can be seen that the interior of kaleidoscope 10 is essentially an upper planar mirror 41 and a lower planar mirror 42 which are attached so as to converge at converging end 25. Upper mirror 41 and lower mirror 42 maintain a constant distance between each other across a transverse line so that the viewing channel is substantially rectangular. As can be seen by reference to FIG. 2, upper surface 41 and lower surface 42 by being attached in a converging fashion as depicted in FIG. 2, provide an open side area 44 which would extend from converging end 25 to viewing lense 18 except that as depicted in FIG. 2, the open side toward viewing lense 18 is enclosed with reflecting mirror 22 having an interior reflecting surface. Likewise on the opposite side, an additional reflecting mirror 43 is provided so that the entire interior of the viewing channel is reflective except for aperture 44 and its corresponding opposite aperture 46.

Figure 3:
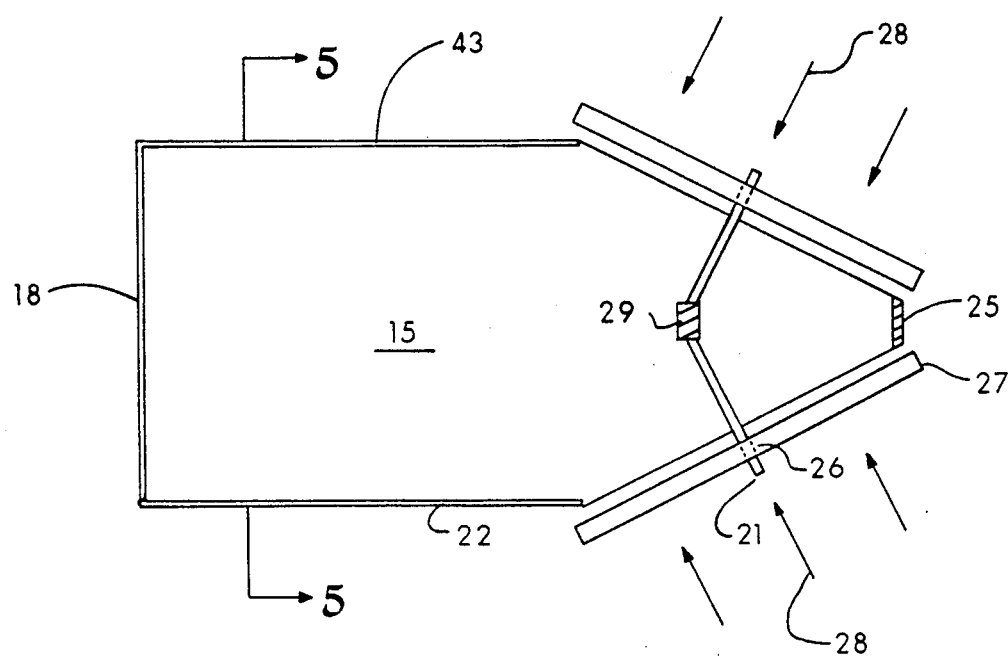
FIG. 3 is a top plan view of the interior apparatus all in accordance with the present invention.

With reference to FIG. 3, it can be seen that edges 23 and 24 of converging mirror surfaces 41 and 42 are arranged at a converging angle so that when viewing through viewing lense 18, a real image and a number of virtual images will appear to the viewer as the images are reflected off the interior reflective surfaces.

Continuing with reference to FIG. 2, it can be seen that rotatable color wheel 19 is provided with rotation axis 21 and image producing artifacts 20. Image wheel 19 is a light admitting disk made of a material such as glass or plastic having various multi-colored artifacts embedded within or attached upon disk 19 in regular or random patterns so that when rotated, disk 19 provides certain colors and light contrasting patterns within apertures 44 and 46.

Now with reference to FIG. 3, it can be seen that exterior surface 15 and corresponding lower surface are planar mirror surfaces each having the reflective surface arranged to the interiors reflect upon against each other and converging on end 25.

Figure 7:
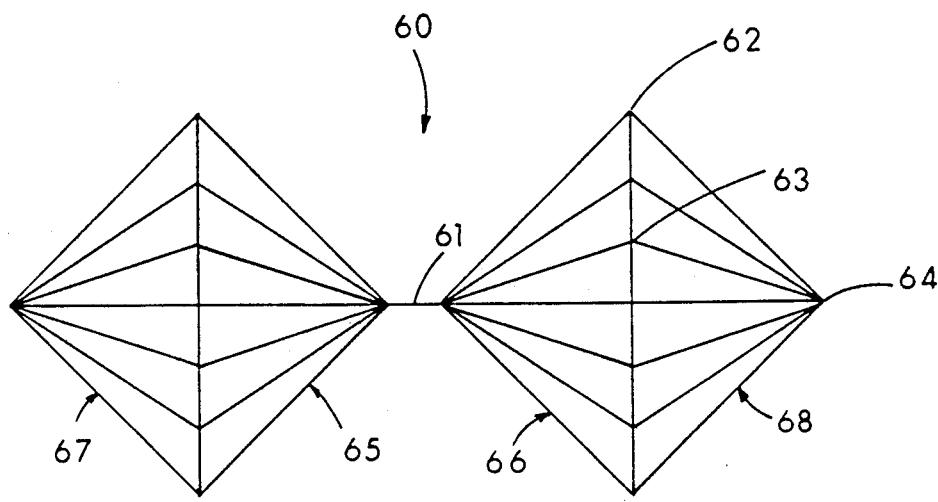
FIG. 7 is a partial depiction of the image produced by the first embodiment of the instant invention as seen by a viewer.

With reference to FIG. 3, it can seen that light rays 28 enter through colored disk 19 and thereupon through apertures 44 and 46 to produce a real image of a triangle when viewed through viewing lense 18. Since the interior surfaces of upper mirror 41, lower mirror 42, and side mirrors 43 and 22 are reflective, the real image is further complimented with multiple virtual images so that the pleasing image as depicted in FIG. 7 is viewed.

In order to change the pattern of the images produced with respect to color, contrast, and shading one merely rotates disk 19 about axle 21 and the images as viewed change. While the angle that rotatable disks 19 make with respect to apertures 44 and 46 can vary, it has been found that as long as upper mirror surface 41 and lower mirror surface 42 converge at forward end 25, that the angle that aperture 44 makes only varies the image to be viewed in heighth and width.

Figure 5:
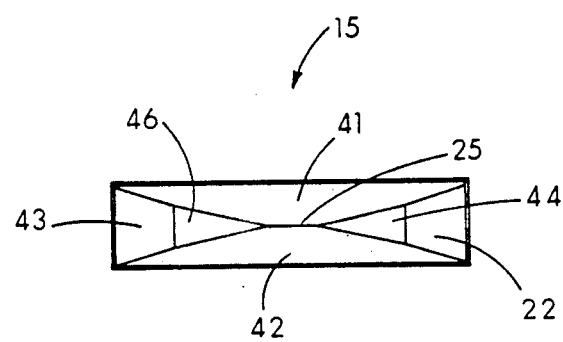
FIG. 5 is a cutaway front view of the interior of the device taken along lines 5—5 in FIG. 3.

With reference to FIG. 3 and FIG. 5, it can be seen that when the interior viewing channel is seen as depicted in FIG. 5 the upper and lower mirror surfaces 41 and 42 and side mirror surfaces 42 and 43 provide reflective surfaces and apertures 44 and 46 are open to admit light coming through color wheel 19 so as to provide a real image. The real image is thereupon multiplied and the image as depicted in FIG. 7 is produced by the reflective viewing channel in which image 60 provides a first left image 65 and a first right image 66. Those images are in turn further reflected to a second left image 67 and a second right image 68. Subsequent images can be seen by the viewer and it should be noted that since the viewing channel is open to both eyes one can view images 65, 67, and 68 simultaneously merely by looking in the appropriate direction. By being able to use both eyes, the kaleidoscope 10 of the instant invention provides a more pleasant and less stressful viewing of the images produced. Furthermore, a perception of a three-dimensional image is achieved since both eyes are focused on the same image.

Figure 4:
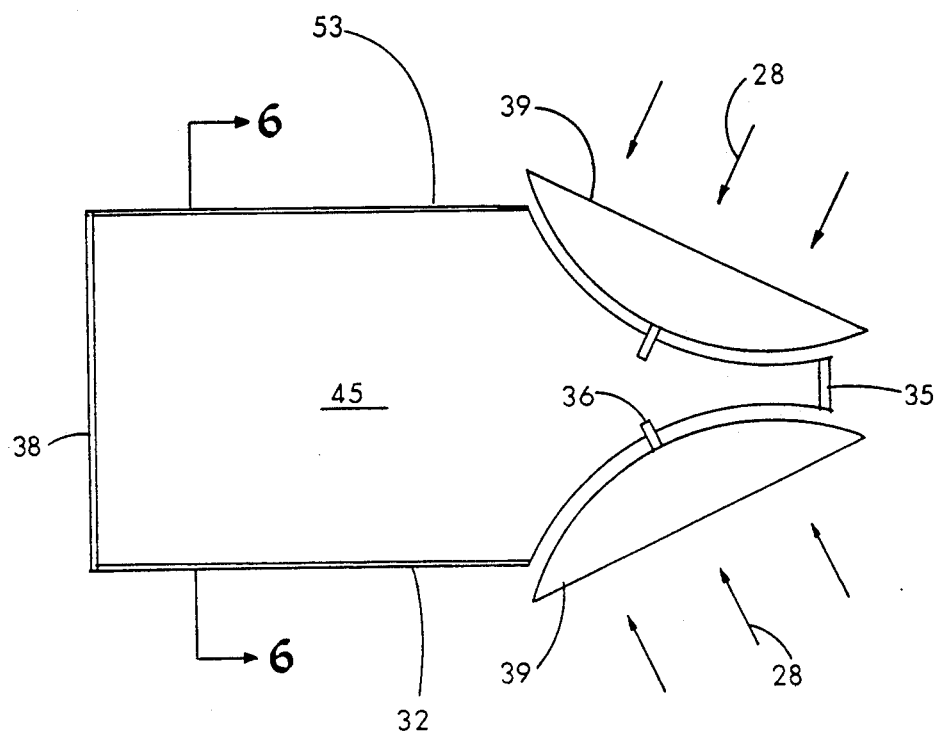
FIG. 4 is a top plan view of a second embodiment of the interior apparatus in accordance with the present invention.
Figure 6:
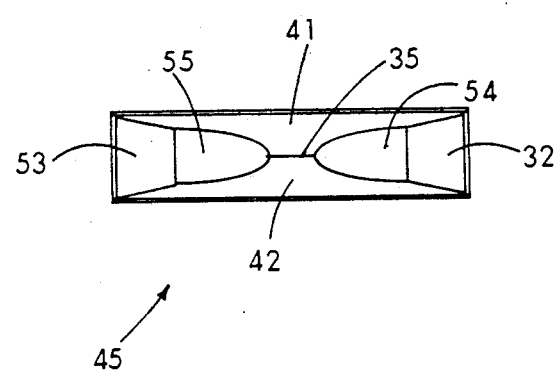
FIG. 6 is a cutaway front view of the interior of the device taken along lines 6—6 in FIG. 4.
Figure 8:
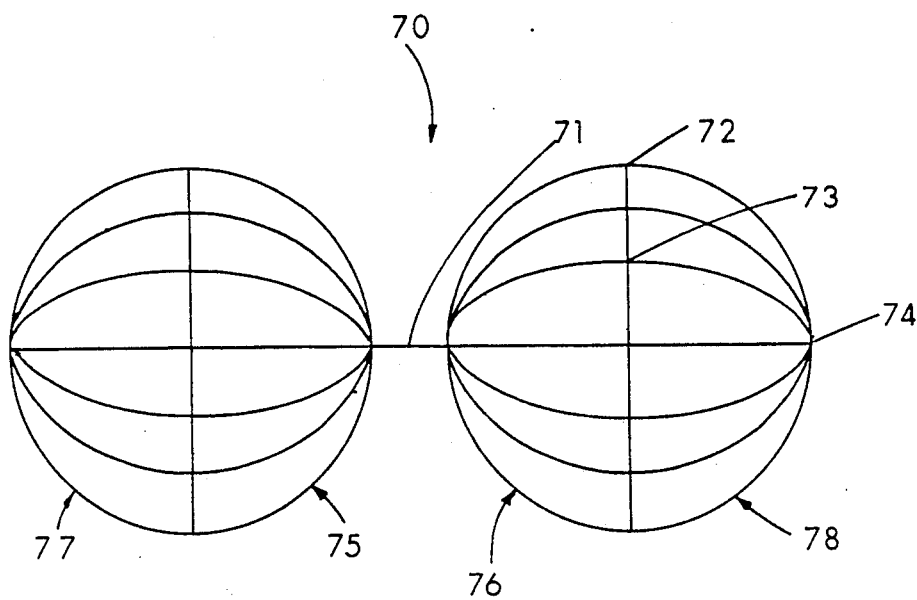
FIG. 8 is a partial depiction of the image produced by the second embodiment of the instant invention as seen by a viewer.

With respect to FIGS. 4 and 6, it can be seen that by varying the geometry of apertures 54 and 55 as well as by providing color dishes 39 which rotate about spindle 36 that the different shaped image as shown in FIG. 8 can be produced. Additional variations in the geometry of apertures 54 and 55 produce an infinite variety of images, some of which may be more pleasing than others, however, in every case the images can be viewed binocularly and appear three-dimensional.

The image 70 as seen in FIG. 8 produced by the second embodiment as depicted in FIGS. 4 and 6, appears as multiple faceted globes having intricate patterns of light and color depending upon the position, type, and texture of colored dishes 39. Colored dishes or curved disks can be made of molded plastic, glass, or any other suitable material.

It should be noted that the mirror surfaces used in constructing the viewing channel of the instant invention 10 can be of ordinary mirror glass having the reflective surface on the second surface or they can be made of a mirror having the first surface reflective so that the images produced are thus sharper and more distinct.

Although specific applications, materials, components, connections, sequences of events, and methods have been stated in the above description of the preferred embodiment of the invention, other suitable materials, other applications, components and process steps as listed herein may be used with satisfactory results and varying degrees of quality. In addition, it will be understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A binocular kaleidoscope for producing images, the kaleidoscope comprising:

a converging viewing channel having a pair of converging mirror surfaces, including an upper planar mirror surface and a lower planar mirror surface wherein said upper and said lower planar surfaces converge at a converging end and diverge at a viewing end; and wherein the interior surface of said upper and said lower surfaces are light reflective and wherein said viewing channel further provides a pair of side image producing openings.

2. A binocular kaleidoscope as described in claim 1 further comprising interior light reflective sidewalls attached to said upper and lower surfaces; and wherein said sidewalls extend from the viewing end partway to said converging end.

3. The binocular kaleidoscope as described in claim 2 further comprising object producing means for producing multi-colored shaped images for viewing through said side openings.

4. The binocular kaleidoscope as described in claim 3 wherein said object producing means is comprised of a pair of light admitting disks.

5. The binocular kaleidoscope as described in claim 4 wherein said disks are selectably rotatable.

6. The binocular kaleidoscope as described in claim 5 wherein each of said disks rotate about an axles defining a disk axis.

7. The binocular kaleidoscope as described in claim 6 wherein said disks axis' converge so as to provide an angled image within said viewing chamber.

8. The binocular kaleidoscope as described in claim 3 wherein said object producing means is comprised of a pair of light admitting dishes.

9. The binocular kaleidoscope as described in claim 7 further comprising a viewing lense attached to said upper and said lower planar surfaces at said viewing end.

10. The binocular kaleidoscope as described in claim 9 further comprising difuser means attached to said object producing means.

11. The binocular kaleidoscope as described in claim 10 wherein said viewing channel is enclosed within an outer housing.

12. The binocular kaleidoscope as described in claim 11 further comprising a housing for said disks.

13. The binocular kaleidoscope as described in claim 11 further comprising a stand having a base and a substantially upright support member attached between said base and said viewing channel.

14. The binocular kaleidoscope as described in claim 13 wherein said upright member and said outer housing are attached at an obtuse angle of incidence.

15. A method of selectively producing a binocular image comprising the steps of:
providing a converging viewing channel having a pair of conversing mirror surfaces, including an upper planar surface and a lower planar surface wherein said upper and said lower planar surfaces converge at a converging end and diverge at a viewing end wherein said upper and said lower surfaces are light reflected and wherein said viewing channel provides a pair of side image producing openings, and having a pair of rotatable light admitting disks; and
viewing the image produced through the viewing end of said binocular kaleidoscope.

16. The method as described in claim 15 further comprising the step of rotating said disk.

17. A method of selectively producing a binocular image comprising the steps of:
providing a converging viewing channel having a pair of converging mirror surfaces, including an upper planar surface and a lower planar surface wherein said upper and said lower planar surfaces converge at a converging end and diverge at a viewing end wherein said upper and said lower surfaces are light reflected and wherein said viewing channel provides a pair of side image producing openings, and having a pair of rotatable light admitting disks; and
viewing the image produced through the viewing end of said binocular kaleidoscope.

18. The method as described in claim 17 further comprising rotating said dishes.

* * * * *